March 14, 1972  E. V. STEFFENSEN ET AL  3,649,362
PRIMARY BATTERY
Filed Sept. 26, 1967
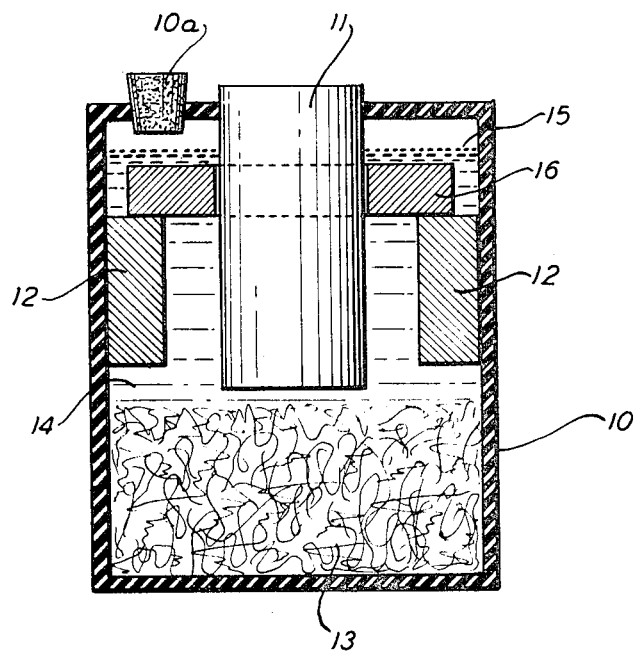
INVENTORS
EINAR V. STEFFENSEN
JOHN ORSHICH
JOHN STEFFENSEN
BY George H. Fritzinger
AGENT United States Patent Office 3,649,362
Patented Mar. 14, 1972

3,649,362
PRIMARY BATTERY
Einar V. Steffensen, Belleville, John Orshich, East Orange, and John Steffensen, West Caldwell, N.J., assignors to McGraw-Edison Company, Elgin, Ill.
Continuation-in-part of application Ser. No. 433,393, Feb. 17, 1965. This application Sept. 26, 1967, Ser. No. 670,536
Int. Cl. H01m 17/02
U.S. Cl. 136—102          7 Claims

ABSTRACT OF THE DISCLOSURE

The invention resides in providing in an alkaline-zinc-anode primary cell an agent which regenerates the electrolyte by causing the zinc reaction end products to crystallize out as zinc-hydroxide when the electrolyte becomes saturated with zincate during discharge of the cell. Further, the invention resides in providing a fibrous mass below the electrodes having a large surface area onto which the crystals of zinc hydroxide grow in preference to forming onto the electrodes. In this way the zinc reaction end products are kept from coating or clogging the electrodes and from interfering with the continuing operation of the cell. The crystallizing agent may be any compound or compounds which function to release sulphide or silicate ions to the electrolyte and may be selected from the group consisting of the silicates of potassium and sodium, sulphur in its precipitated or sublimed forms, thiourea ($NH_2CSNH_2$) and the sulphides of calcium, zinc (precipated form), potassium, sodium, strontium, antimony, mercury, barium, aluminum, and phosphorus. The action of the sulphide ion crystallizing agents is improved by adding a small amount of zinc oxide especially as to air depolarized cells which are to have good life on open circuit. The fibrous mass may be of glass wool, cotton linters, shredded or loosely folded kraft paper, polyethylene fibers, asbestos wool, steel wool or nylon fibers.

---

This application is a continuation-in-part of our application Ser. No. 433,393, entitled Primary Battery and filed Feb. 17, 1965 now abandoned.

An object of the invention is to provide new and improved agents which when added to the electrolyte of a caustic alkaline primary cell will operate to regenerate the electrolyte and extend the life of the battery as well as to cause the battery to operate at ultimate efficiency.

Another object is to accomplish the aforestated beneficial effects by the addition of economical agents to the electrolyte which can be used in their natural forms.

Another object is to provide improvements in alkaline primary cells using zinc anodes, which operate to keep the electrodes free of deposits of zinc reaction end products.

Another object is to provide such batteries with electrolyte agents which operate to promote the crystallization of zinc reaction end products as zinc hydroxide in areas away from the electrodes.

Another object is to provide such batteries with a fibrous mass in the electrolyte onto which zinc hydroxide crystals will grow in preference to forming on the electrodes whereat they would adversely affect the life and efficiency of the cell.

Other objects and features of the invention will be apparent from the following description and the appended claims. In the description of the invention reference is had to the accompanying drawing showing a sectional view of a primary battery embodying the invention.

The primary battery shown in the accompanying figure is of the air-depolarizing type comprising a container 10 as of hard rubber having therein a centrally located air-depolarizing cathode 11 of a porous carbon material preferably of a petroleum coke base, which may be cylindrically shaped and extended from the top of the cell downwardly through a major portion of the height of the cell. Opposite to the carbon cathode are one or more zinc anodes 12 of which two are shown each of a block form. The space in the cell below the electrodes contains a fibrous mass 13 preferably of glass wool or cotton linters, and the entire free space in the cell is filled with an alkaline electrolyte solution 14 preferably of potassium hydroxide to a level 15 above the zinc anodes.

Generally, in the operation of air-depolarized batteries where no special provision is made for removing the zinc reaction products, the zinc is electrolytically oxidized and combined with the potassium hydroxide electrolyte to form a soluble potassium zincate. As the cell is continued to be discharged there is a progressive accumulation of zincate until the electrolyte solution becomes saturated. As the cell is further discharged zincate in excess of the saturation level is formed and decomposed. In this decomposition process there is a reversal of the process by which the zincate was formed—i.e., zinc oxide is formed as a precipitate and potassium hydroxide is returned to the solution. The zinc oxide precipitate is a bluish white powdery substance which deposits at least in part on the electrodes to reduce their surface contact with the electrolyte. In air-depolarized cells, the deposits of zinc oxide on the carbon cathodes are very detrimental because they clog the pores and "choke" the action of the electrodes. The deposits therefore reduce the ampere hours capacity and life of the cells.

Heretofore, the deleterious action of zincates in zinc anode alkaline electrolyte primary cells has been attacked by adding lime to the electrolyte as in the manner disclosed in the Dunham et al., Pat. No. 2,450,472. The action of the lime is to combine with the alkali zincate and form regenerated electrolyte and highly insoluble calcium zincate. Although this method of attacking the zincate problem has been successful, it is accompanied by certain disadvantages one of which is the expense of producing the lime in the special form necessary for the purpose intended and a second of which is the low volume efficiency of the lime. The present invention resides in the use of agents in the electrolyte which do not have to be processed into any special form, which have high volume efficiency and which operate in a novel manner to regenerate the electrolyte and increase the output capacity per unit volume of zinc anode alkaline electrolyte cells much more than has been heretofore possible with the use of lime. These agents comprise compounds which release sulphide and silicate ions. It has been discovered that these ions cause the zinc reaction end product to crystallize out as zinc hydroxide at a commercially sufficient rate when there is a fibrous mass present in the cells. It is a remarkable fact that the presence of these ions serves to increase the solubility of zinc in caustic alkaline solution and that the higher concentration of zinc results in the crystallization of zinc hydroxide rather than the precipitation of detrimental zinc oxide. That silicate or sulphide ions are the vital components of the crystallizing agents is shown by tests in which satisfactory crystal growths of zinc hydroxide have been formed on the fibrous mass and in which full battery capacity has been obtained using a wide variety of agents. These agents comprise the silicates of potassium and sodium, sulphur in its precipitated and sublimed forms, thiourea ($NH_2CSNH_2$) and the sulphides of zinc (precipitated form only), calcium, potassium, sodium, strontium, antimony ($Sb_2S_3$), mercury (HgS), barium, aluminum ($Al_2S_3$) and phosphorous ($P_2S_5$). Of the sulphide ion agents sodium sulphide is preferred and of the silicate ion agents sodium silicate is preferred because of their low cost, ready availability and ease of handling.

It is believed that any agent soluble in the electrolyte to produce sulphide or silicate ions is operative for the purposes of the invention. For example, sulphides which have been found to be inoperative for the present purposes are the sulphides of cadmium, lead, copper, zinc (calcined form) and nickel. Each of these sulphides is characterized as being very poorly soluble in alkaline electrolyte solutions.

In air-depolarizing cells the oxygen from the air at the interface of the air-depolarizing electrode with the electrolyte will oxidize the sulphide ions during standing of the cells on open circuit and thus destroy the ability of the ions to induce crystallization of zinc hydroxide. The addition of a small amount of zinc oxide at the same time that the sulphide ion agent is added, in an amount at least equal to the chemical equivalent of the ion sulphide agent, will cause the sulphide ions to attach to zinc ions in preferance to being oxidized while preserving the beneficial effect of the sulphide in the electrolyte.

In deferred action cells using sulphide ion agents, the agent may be provided as follows: technical grade sodium sulphide flake is pulverized for one hour in a ball mill. An equal weight of U.S.P. grade zinc oxide powder is then added to the ground sodium sulphide and the mixture is blended in a paddle mixer for one hour. In manufacture of the cells the fibrous mass, say glass wool, is put in the space beneath the electrodes and then the sodium sulphide plus zinc oxide mixture is dumped onto the glass wool just before the cell is sealed. For a battery which after activation by addition of water has an electrolyte volume of 2.2 liters, 20 grams of the sodium sulphide plus zinc oxide mixture is sufficient. The water is added through a filler opening which is kept normally closed as by a cork 10a.

In deferred action cells using silicate ion agents, the agent may be provided as part of a cast block 16 of potassium hydroxide which is placed in the cell container when the cell is assembled. The user then activates the cell by adding water thereto. The cast block 16 is provided preferably in an annular form suspended in the upper part of the container around the cathode as is illustrated in the drawing.

The term "fibrous" as applied to the mass 13 is herein employed as not only including the strictly fibrous masses but also any open texture, porous or granular masses having open channels, pores or interstices presenting large surface areas in contact with the electrolyte. Operating tests have shown that glass wool, cotton linters, shredded or loosely folded kraft paper, polyethylene fibers, asbestos wool and nylon fibers are all satisfactorily operative. Steel wool is also operative but is not as satisfactory because its conductivity requires that it be confined wholly out of contact with the electrodes. Glass wool and cotton linters appear to be superior and are preferred. The reason these materials form preferred sites for the growth thereon of crystalline zinc hydroxide is not known other than that they present a large surface area which is conducive to the growth thereon of the crystals or that in some instances they may be slightly soluble in alkaline hydroxide solution to have a catalytic effect in attracting the crystals of zinc hydroxide.

By way of typical example, the electrolyte solution may be 5 to 6 normal potassium hydroxide, the silicate agent may be present in the amount of 4 to 12 grams per liter of electrolyte solution calculated as silicon dioxide ($SiO_2$); and the sulphide agent may be present in the amount of from .5 to 2 grams per liter of electrolyte solution calculated as sulphur. Two or more of these silicates and sulphides may be used in the same cell in which case the amounts of the respective agents are proportionately reduced. The zinc oxide is preferably added as an initial ingredient in an amount which is at least the chemical equivalent of the sulphur containing agent.

The operation in a preferred cell using sodium sulphide, zinc oxide and potassium hydroxide is as follows: When the user adds water to the cell the sodium sulphide dissolves giving sulphide ions and the zinc oxide reacts therewith to form zinc sulphide. As the battery is discharged, more zincate goes into solution as the zinc metal anode is consumed and more zinc sulphide dissolves until finally a saturation point is reached causing crystallization of zinc hydroxide upon any suitable substrate of large surface area such as is provided by the fibrous mass 13.

The crystallization of zinc hydroxide as against the deposition of zinc oxide is carried out at the expense of water from the electrolyte solution and has the effect therefore of causing the electrolyte solution to become slightly more concentrated as the cell is discharged. The prime advantage of crystallizing zinc hydroxide instead of precipitating zinc oxide or reacting the zinc electrolyte reaction product with lime is that the hydroxide crystallizes out onto the fibrous mass leaving the electrodes clean and at their utmost efficiency, and the crystallizing agent requires very little space compared to the large volume required by lime permitting therefore much more reaction end products to be contained per unit volume of the battery.

These advantages of the present invention are shown by the following battery discharge tests. Two different batteries of equal size made with aqueous potassium hydroxide and with similar air-depolarizing carbon cathodes and zinc anodes, but with one having the greatest possible quantity of highly efficient lime to react with the zinc electrode reaction products and the other having a sodium sulphide crystallizing agent and a glass wool fibrous mass, were discharged at 250 milliamperes. The battery with lime delivered 1200 ampere hours at useful voltage before voltage fell sharply; at the end of discharge the cell was filled with reacted lime and bluish zinc oxide that had continued to form after the lime was fully reacted. On the other hand, the battery with sulphide and glass wool in accordance with the present invention delivered 1500 ampere hours at useful voltage before voltage fell sharply; at the end of discharge the glass wool mass was converted into a highly crystalline mass of zinc hydroxide and there was still much room in the battery beneath the electrodes in which more crystals of zinc hydroxide could have grown had even larger zinc electrodes been provided. This example shows that the present invention makes possible significant and practically important increases in capacity per unit volume in zinc batteries of the air breathing type by compacting or sequestering the zinc electrode reaction products in less space than has heretofore been possible using lime made and practiced in accordance with the best present day art.

Thousands of batteries made in accordance with this invention have been tested in the field; they gave good service under the climatic conditions of all seasons of the year.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. In a primary battery comprising an air-depolarizing cathode of a petroleum coke base and a zinc anode: an electrolyte composition including a caustic potash solution and an agent soluble in said solution and having the capability of causing the zinc compounds formed in the solution during discharge of the battery to crystallize out as zinc hydroxide, said agent being one or more materials selected from the group consisting of the silicates of potassium and sodium, thiourea, sulphur in its precipitated and sublimed forms, and the sulphides of zinc (precipitated form), calcium, potassium, sodium, strontium, antimony, mercury, barium, aluminum, and phosphorus, and a fibrous mass in said cell below said cathode and anode for promoting growth of crystalline zinc hydroxide thereon in preference to a formation of the hydroxide thereon in preference to a formation of the hydroxide on said cathode and anode, said fibrous mass being one or more materials selected from the group consisting of glass wool, cotton linters, shredded or loosely folded kraft paper, polyethylene fibers, asbestos wool, steel wool and nylon fibers.

2. The primary battery as set forth in claim 1 wherein said electrolyte solution is between 5 to 6 normal concentration, the silicate agent when provided alone is in the amount of from 4 to 12 grams per liter of electrolyte solution calculated as silicon dioxide ($SiO_2$) and the sulphide agent when provided alone is present in the amount of from .5 to 2 grams per liter of electrolyte solution calculated as sulphur.

3. In a primary battery comprising an air depolarizing cathode and a zinc anode: an electrolyte composition including a caustic alkaline solution, zinc oxide and an agent soluble in said alkaline solution and having the capability of causing the zinc compounds formed in the solution during discharge of the battery to crystallize out as zinc hydroxide, said agent including one or more materials selected from the group consisting of thiourea, sulphur in its precipitated and sublimed forms, and the sulphides of zinc (precipitated form), calcium, potassium, sodium, strontium, antimony, mercury, barium, aluminum and phosphorous, said zinc oxide being provided in an amount which is at least the chemical equivalent of the amount of said agent added to the alkaline solution, and a fibrous mass in said cell below said cathode and anode for promoting growth of crystalline zinc hydroxide thereon in preference to a formation of the hydroxide on said cathode and anode.

4. In a primary battery: the combination of an air-depolarizing cathode of a petroleum coke base, a zinc anode, an electrolyte composition including a caustic alkaline solution, zinc oxide and an agent soluble in said solution and capable of causing the zinc compounds formed in the solution during discharge of the battery to crystallize out as zinc hydroxide, said agent including the sulphur containing materials which release sulphide ions in the solution, and a fibrous mass in said cell below said cathode and anode for promoting growth of crystalline zinc hydroxide thereon in preference to a formation of the hydroxide on said cathode and anode.

5. In an air-depolarized primary battery having an air-depolarizing porous carbon cathode: the combination of a container supporting said cathode with one end portion exposed to the air and the remaining portion extending into said container, a zinc anode supported adjacent to said cathode, said container having free space around and below said cathode and anode, a caustic potash electrolyte solution filling said free space to a level above said zinc anode, a metal salt in said electrolyte solution selected from the group consisting of the silicates of potassium and sodium and the sulphides of calcium, zinc, potassium and sodium, and a mass of fibrous glass immersed in said electrolyte solution in the lower portion of said container below said cathode and anode and having an affinity for zinc hydroxide causing the zinc hydroxide to deposit thereon.

6. In a primary electric battery having a container, a cathodic electrode, a zinc anode and an electrolyte consisting of caustic alkali dissolved in water and into which the zinc is electrolytically oxidized forming zincate during the discharge of the battery: a crystallizing agent in said electrolyte solution for initiating a spontaneous crystallization of crystalline zinc hydroxide from said electrolyte when the same becomes saturated with zincate during the discharge of the battery, said crystallizing agent being one or more materials selected from the group consisting of the silicates of potassium and sodium and the sulphides of calcium, zinc, potassium and sodium, and means for causing a crystallization of said zinc hydroxide in a localized region of said container away from said electrodes, said means comprising a fibrous mass of silicate material situated in the lower portion of the container and having an affinity for attracting said zinc hydroxide.

7. A sealed deferred-action primary battery adapted to be unsealed and filled with water at time of use, said battery comprising a container, a porous air-depolarizing carbon cathode, a zinc anode, and a body of electrolyte-forming material, said body of electrolyte-forming material comprising a mixture of caustic alkali and an addition agent selected from the group consisting of the silicates of potassium and sodium and the sulphides of calcium, zinc, potassium and sodium, said body being dissolved to activate said cell when the cell container is substantially filled with water, said addition agent being operative to cause the zinc reaction products in said electrolyte to precipitate as zinc hydroxide during the discharge of the battery, and a mass of glass wool in a lower portion of said container below said cathode and anode and having an affinity for attracting said zinc hydroxide and causing the same to deposit therein.

References Cited
UNITED STATES PATENTS

| | | | |
|---|---|---|---|
| 1,201,481 | 10/1916 | McGall et al. | 136—153 |
| 2,624,767 | 1/1953 | Moulton | 136—102 |
| 2,641,623 | 6/1953 | Winckler et al. | 136—121.1 |
| 2,708,683 | 5/1955 | Eisen | 136—19 |
| 2,848,525 | 8/1958 | Schumacher et al. | 136—102 |
| 2,941,909 | 6/1960 | Johnson et al. | 136—154 |
| 3,121,028 | 2/1964 | Story | 136—153 |
| 2,907,809 | 10/1959 | Southworth et al. | 136—102 |
| 3,392,057 | 7/1968 | Sakagami et al. | 136—107 |
| 3,418,166 | 12/1968 | Carter | 136—154 |

FOREIGN PATENTS

| | | | |
|---|---|---|---|
| 1,093,828 | 12/1967 | Great Britain | 136—154 |

WINSTON A. DOUGLAS, Primary Examiner

C. F. LeFEVOUR, Assistant Examiner

U.S. Cl. X.R.

136—121, 154